May 24, 1960 N. BERMAN 2,938,199

SEQUENTIAL PULSE ANALOGUE TO DIGITAL CONVERTER

Filed July 24, 1957 3 Sheets-Sheet 1

INVENTOR
NELSON BERMAN
BY Henry L. Shenier
ATTORNEY

SEQUENTIAL PULSE ANALOGUE TO DIGITAL CONVERTER

INVENTOR
NELSON BERMAN
BY Henry L. Shenier
ATTORNEY

INVENTOR.
NELSON BERMAN
BY
Henry L. Shenier
ATTORNEY

United States Patent Office 2,938,199

Patented May 24, 1960

2,938,199

SEQUENTIAL PULSE ANALOGUE TO DIGITAL CONVERTER

Nelson Berman, New Hyde Park, N.Y., assignor, by mesne assignments, to United Aircraft Corporation, East Hartford, Conn., a corporation of Delaware Filed July 24, 1957, Ser. No. 673,877

8 Claims. (Cl. 340—347)

My invention relates to an improved analogue to digital converter and more particularly to an improved analogue to digital transducer for producing groups of pulses spaced in time, each of which pulses represents a digit of a binary digital representation.

Analogue to digital transducers of the prior art employ means, such as brushes and contacts arranged in a pattern, which produce a binary digital representation of the position of a movable member with respect to a stationary member. As the brushes make and break contact with the conducting segments, "noise" or unwanted output signals are produced. These transducers of the prior art require adjustment and replacement of worn brushes at relatively frequent intervals. The transducers of the prior art simultaneously produce a number of separate output signals or pulses, each of which represents a respective digit of the binary digital representation. Where the representation is to be reproduced at a remote location, these output signals or pulses must be conducted over separate respective channels to the location at which the representation is to be reproduced.

In the copending application of Nelson Berman and Sheldon Girsch, Serial No. 603,427, filed August 10, 1956, now Patent No. 2,938,198, an improved analogue to digital transducer is disclosed which employs electromagnetic means for producing a binary digital representation. That improved transducer does not require the frequent maintenance necessary in transducers of the prior art. In one form of that improved transducer, a single output signal is produced which embodies the entire binary digital representation. The representation may be conveyed over a single channel to a remote location. The improved transducer disclosed in the said copending application produces a continuous alternating current output signal or a plurality of continuous alternating current output signals embodying the binary digital representations. Where the device with which that analogue to digital transducer is used requires an input in the form of pulses, the continuous alternating current signals must be rectified.

I have invented an improved analogue to digital converter or transducer for producing a binary digital representation, in the form of pulses spaced in time, of the position of a movable member with respect to a stationary member. My transducer does not employ means such as brushes which must make and break contact with conducting segments. It does not generate the brush "noise" produced in transducers of the prior art. Since my transducer produces an output in the form of pulses, no conversion of alternating current signals is necessary when my transducer is to be used with a device requiring a pulsed input. The groups of pulses produced by my transducer may be conducted over a single channel to a remote location.

One object of my invention is to provide a sequential pulse analogue to digital transducer for producing a series of spaced pulses embodying a binary digital representation of the position of a movable member with respect to a stationary member.

Another object of my invention is to provide a sequential pulse analogue to digital transducer which produces less "noise" than transducers of the prior art.

A further object of my invention is to provide a sequential pulse analogue to digital transducer in which no conversion of alternating current signals is necessary where a pulsed output is required.

A still further object of my invention is to provide a sequential pulse analogue to digital transducer, the output of which may be conducted over a single channel to a remote location.

Other and further objects of my invention will appear from the following description:

In general, my invention contemplates the provision of a sequential pulse analogue to digital transducer including electromagnetic means for producing groups of pulses spaced in time. Each of the respective pulses of a group represents one digit of the binary digital representation of the position of a movable member with respect to a stationary member. I provide auxiliary electromagnetic means for varying the amplitudes of the respective pulses in accordance with a predetermined pattern to afford the desired binary digital representation. In one form of my invention I accomplish the variation in amplitude of a pulse by varying the reluctance of the flux path of the pulse generating means. In a second form of my invention I vary the amplitude of a pulse by shunting the flux path of the electromagnetic pulse producing means.

In the accompanying drawings which form part of the instant specification and which are to be read in conjunction therewith and in which like reference numerals are used to indicate like parts in the various views.

Figure 1:
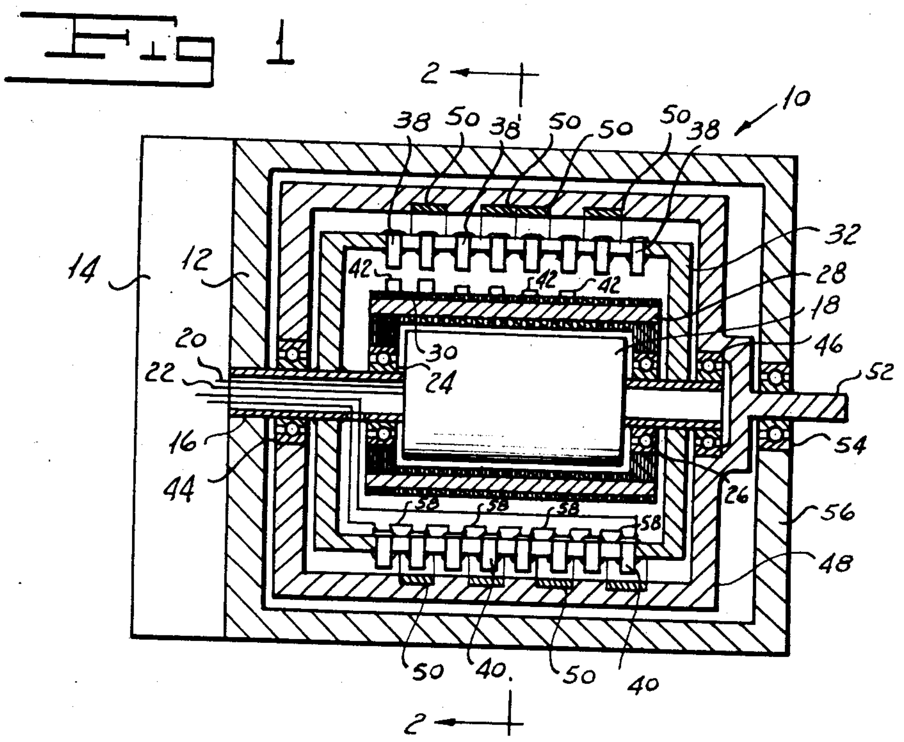
Figure 1 is a sectional view of one form of my sequential pulse analogue to digital transducer.
Figure 2:
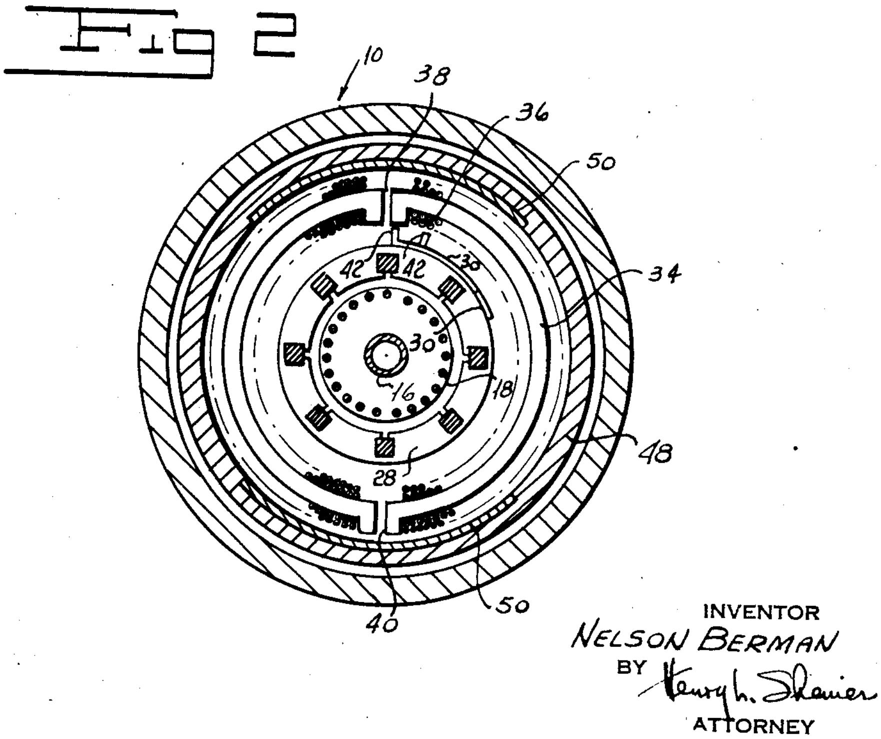
Figure 2 is a sectional view of my sequential pulse analogue to digital transducer taken along the line 2—2 of Figure 1.

More particularly referring now to Figures 1 to 4 of the drawings, my sequential pulse analogue to digital transducer includes a cylindrical housing, indicated generally by the reference character 10, one end 12 of which carries a terminal board 14. I mount one end of the hollow stationary shaft 16 of the stator 18 of a motor, which may be a single phase induction motor of the squirrel cage type, in end 12. Respective conductors 20 and 22 energize the field windings carried by stator 18 from a suitable source of electrical energy (not shown). Respective bearings 24 and 26 carried by shaft 16 rotatably support the motor rotor 28. When conductors 20 and 22 are supplied with power, rotor 28 rotates about shaft 16 in a manner known to the art.

I fix a plurality of permanent magnets 30 by any convenient means on the outer surface of rotor 28 for movement with the rotor. Stationary shaft 16 carries a stationary support 32 on which I mount a plurality of electromagnetic pick-up devices, each of which includes an annular laminated core 34 and a winding 36. The number of pick up devices corresponds to the number of magnets 30 carried by rotor 28. I provide each core 34 with a radially inwardly directed air gap 38 and a radially outwardly directed air gap 40 which is substantially diametrically opposite the air gap 38. Each of the magnets 30 is formed with an upstanding pole piece 42 positioned to pass by the gap 38 of the corresponding core 34 as rotor 28 rotates with respect to the stationary support 32 to generate a signal in the winding 36. As can best be seen by reference to Figure 3, I space the magnets 30 around the surface of rotor 28 so that the signals produced in successive pairs of windings 36 in the direction of the axis of rotor 28 are spaced in time. In the embodiment of my invention shown, for a single revolution of rotor 28 four groups of two such signals each are produced.

Respective bearings 44 and 46 carried by shaft 16 outboard of support 32 carry the data drum 48 of my transducer. Drum 48 carries a plurality of segments 50 of magnetic material which may conveniently be embedded in or otherwise attached to the inner surface of drum 48. I form one end of drum 48 with a stub shaft 52 which passes through a bearing 54 in an end 56 of housing 10. Shaft 52 provides a means by which the data drum 48 may be positioned with respect to the electromagnetic pickup devices. The segments 50 are positioned variably to influence the air gaps 40 of the respective cores 34. When a segment 50 is disposed adjacent the air gap 40 of the corresponding core 34, the magnitude of the signal induced in the winding 36 as the magnet 30 passes by the gap 38 increases. In other words, the reluctance of the flux path provided by core 34 decreases to permit more of the flux from the magnet 30 to link winding 36.

Figure 4:
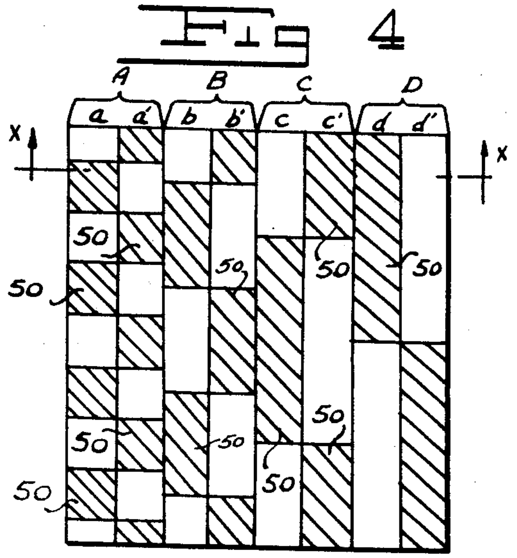
Figure 4 is a development of the inner surface of the pattern drum of my sequential pulse analogue to digital transducer showing the arrangement of segments, with the segments shown in section for purposes of clarity.
Figure 5:
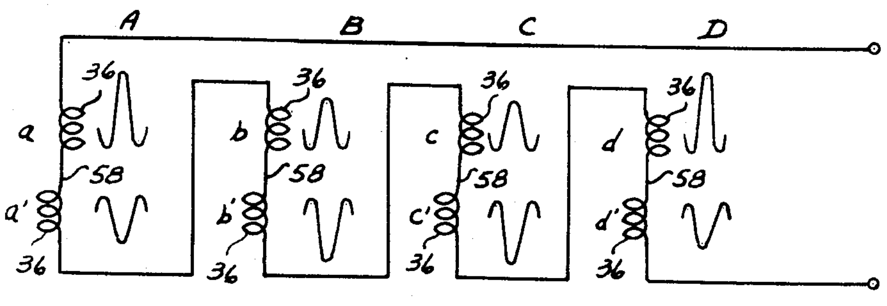
Figure 5 is a schematic view of the pulse producing means of my sequential pulse analogue to digital transducer showing the induced voltage wave forms generated in the respective coils.

As can be seen by reference to Figure 4, I arrange the rows of segments 50 in pairs corresponding to the number of pairs of pickup devices. Alternate rows of segments 50 are arranged in a coded pattern which may be any required pattern to produce a desired representation. For example, the alternating rows of segments could be arranged to produce a representation in the natural binary code. In order to reduce the potential ambiguity present in my transducer, I have arranged the alternate rows of segments in accordance with the "Gray" code. As is known in the art and is more fully explained in the said copending application, this arrangement of segments ensures that a possible ambiguity if it occurs, can only do so between two consecutive representations. I stagger the segments 50 of a pair of rows with respect to each other. As a result of this arrangement, a segment 50 is adjacent the air gap 40 of one pickup device of a pair, while no segment 50 is adjacent the gap 40 of the other pickup of the pair. Consequently, the signal induced in winding 36 of one of the pickup devices is at its maximum amplitude while the signal induced in the winding 36 of the other pickup device of the pair is of less amplitude. Referring now to Figure 5, I connect the windings 36 of a pair of electromagnetic pickup devices in series-opposed relationship by means of conductors 58. Owing to these connections, the respective signals induced in a pair of windings 36 subtract, with the result that each pair of windings produces a single pulse output.

Figure 3:
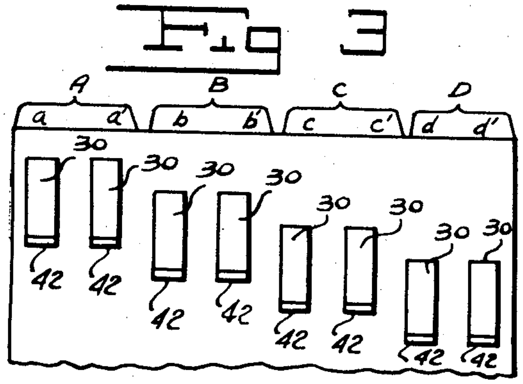
Figure 3 is a development of a portion of the surface of the rotor of my sequential pulse analogue to digital transducer showing the relative positions of the magnets of the respective pulse producing means.

For purposes of convenience, in Figures 3 to 5 inclusive, I have designated the four sections of my transducer respectively by A, B, C, and D. Each section includes a pair of magnets 30, a pair of electromagnetic pickup devices including windings 36, and a pair of rows of segments 50. One magnet of each pair and the corresponding row of segments and winding 36 are designated by the lower-case letter corresponding to the capital letter designating the section. The other magnet, row of segments, and winding of the pair are designated by the same lower-case letter primed. With the pattern drum in a position where the air gaps 40 of the respective cores 34 lie substantially along the line X—X of Figure 4, winding "*a*" produces a signal of the form shown alongside the winding in Figure 5. Owing to the fact that a segment 50 lies adjacent the air gap 40 of the core 34 corresponding to the winding, the magnitude of this signal is a maximum. At the same time winding "*a'* " produces a signal of the form shown in Figure 5. Since the row *a'* of segments is staggered with respect to the row *a* at this time, no segment 50 is adjacent the air gap 40 corresponding to the *a'* winding and the magnitude of the signal induced in the *a'* winding is substantially less than the magnitude of that induced in the *a* winding. Owing to the fact that the *a* and *a'* windings are connected in series-opposed relationship, the signals induced in the respective windings subtract, with the result that the A section of my transducer produces a single positive pulse as the pole pieces 42 of the *a* and *a'* magnets pass the air gaps 38 of the cores 34 carrying the *a* and *a'* windings.

In a similar manner, as the pole pieces 42 of the "*b*" and "*b'* " magnets pass the gaps 38 of the cores 34 carrying the *b* and *b'* windings the B section produces a negative pulse. In a similar manner, with the air gaps 40 substantially along the line X—X in Figure 4 the C and D sections produce respectively a negative and a positive pulse.

Figure 6:
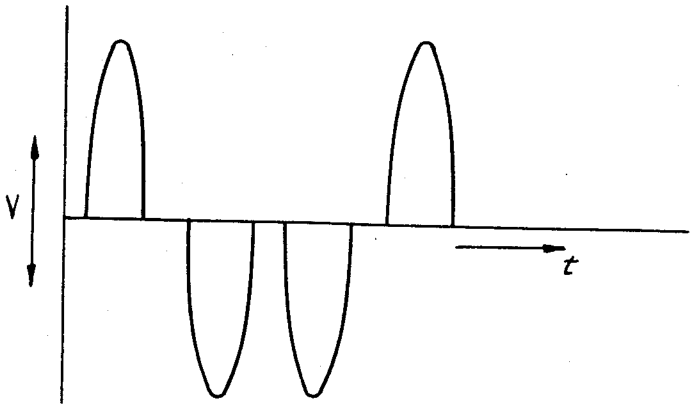
Figure 6 is a plot of a group of pulses produced by my analogue to digital converter.

Since the magnets 30 of the respective sections A, B, C, and D are spaced around the rotor 28, the pulses produced by the respective sections are spaced in time. With the form of my invention shown and with the air gaps 40 lying substantially along the line X—X of Figure 4, a group of four pulses successively positive, negative, negative and positive are produced by my transducer. These pulses are shown in Figure 6. I have chosen a positive pulse to represent a "1" and a negative pulse to represent a "0" in the binary system. It will be seen that with the air gaps 40 lying substantially along the line X—X in Figure 4, my transducer produces a pulse output representing the binary number 1001. As is known in the art, this binary number represents the number nine in the "Gray" code. With the four pulses produced by the form of my transducer shown, I am able to represent positions of shaft 52 from zero to fifteen. By using a greater number of pairs of magnets 30, pickup devices including windings 36 and rows of segments 50, I may represent a greater number of shaft positions. It will be appreciated that while I have shown a pattern of segments 50 arranged to produce a binary representation of the position of shaft 52 in the "Gray" code, I may arrange the segment to produce a binary representation of any desired function of shaft position.

Figure 7:
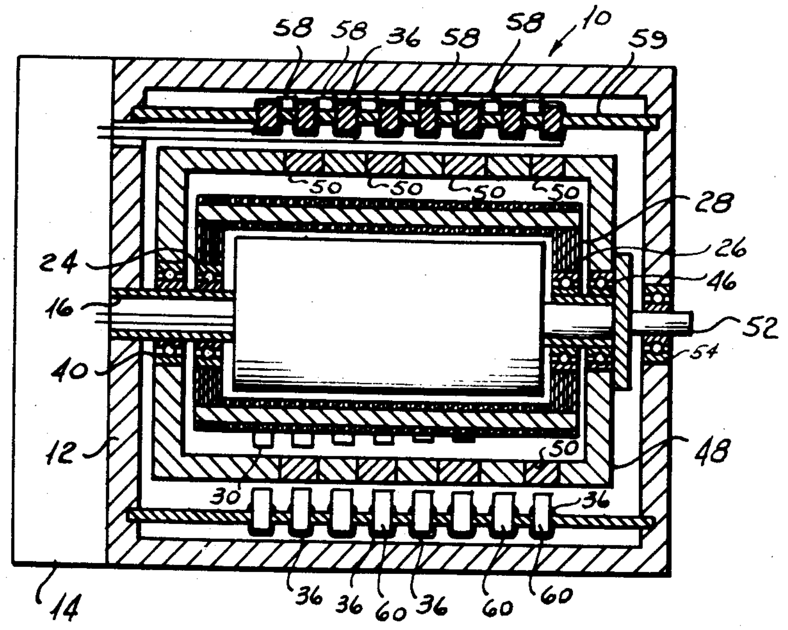
Figure 7 is a sectional view of a second form of my sequential pulse analogue to digital transducer.

Referring now to Figure 7, I have shown a second form of my invention in which the respective amplitudes of the pulses produced by my transducer are varied by shunting the magnetic flux produced by magnets 30. In this form of my invention as in the form of my invention shown in Figures 1 to 4, the rotor 28 carries the magnets 30 and is rotatably supported on stationary shaft 16 by bearings 24 and 26. Also as in the form of my invention shown in Figures 1 to 4, drum 48 is mounted on respective bearings 44 and 46 carried by shaft 16 outboard of bearings 24 and 26. It is to be noted, however, that I do not in this form of my invention mount the electromagnetic pickup devices including cores 34 and windings 36 between magnets 30 and the drum 48. Rather, I mount the pickup devices in a support 59 fixed to the housing 10 by any convenient means. In this form of my invention the segments 50 are disposed between the magnets 30 and the pickup devices. Each of the cores 34 of the electromagnetic pickup devices needs only be provided with a single inwardly directed air gap 60. When a magnetic segment 50 is adjacent the air gap 60 of a core 34, it shunts the magnetic flux from the corresponding magnet 30 to reduce substantially the amount of flux linking the associated winding 36. As a result of this shunting, the magnitude of the signal induced in a winding 36 is greatly reduced when a segment 50 is adjacent the corresponding air gap 60. With the windings 36 of each pair connected in series-opposed relationship, the reduced magnitude signal is subtracted from the normal magnitude signal to produce an output pulse for the section. It will be seen that with the segment pattern as shown in Figure 4, a group of pulses in the following order—negative, positive, positive, negative—will be produced with the air gaps 60 lying along the line X—X of Figure 4. In order to produce an output corresponding to that produced by the form of my invention shown in Figures 1 to 4, I remove all segments from the space occupied by the segments of Figure 4 and place segments in all the inter-segment spaces shown in Figure 4. This is a convenient means for inverting the pulses in the form of my invention shown in Figure 7 to produce an output in which a positive pulse represents a "1" and a negative pulse represents a "0" in the binary system.

While I have shown and described my invention as producing a binary digital representation of the angular position of a rotating member with respect to a stationary member, it is to be understood that I may arrange my segments in a movable member providing a plane surface. As this plane member moves with respect to the pickup devices, a binary digital representation is produced which affords an indication of the linear position of the plane member. Further, it is to be noted that I may provide more than a single group of magnets 30 on the surface of rotor 28 to provide more than a single group of pulses on each revolution of the rotor if desired.

In operation of the form of my invention shown in Figures 1 to 4, stator 18 is supplied with electrical energy to drive rotor 28 to move magnets 30 past the air gaps 38 to produce respective output signals in the pairs of electromagnetic pickup windings 36. Pattern drum 48 is driven in accordance with any desired function through shaft 52 to position segments 50 adjacent air gaps 40. Owing to the series-opposed connections between the pairs of windings 36, the signals in the pairs of windings subtract to produce a pulse output. Since the pairs of magnets 30 are spaced around rotor 28, the output pulses are spaced in time. The particular pattern of segments 50 shown in Figure 4 produces a binary digital representation in the "Gray" code of the angular position of shaft 52. In this form of my invention the segments 50 vary the reluctance of the flux path provided by the cores 34 to vary the respective amplitudes of the signals induced in the winding 36.

In the form of my invention shown in Figure 7, the segments 50 vary the respective amplitudes of the signals induced in windings 36 by shunting the fluxes from the magnets.

It will be seen that I have accomplished the objects of my invention. I have provided a sequential pulse analogue to digital transducer for producing a series of pulses spaced in time which afford a binary representation of the position of a movable member with respect to a stationary member. My transducer includes no brushes and does not generate the brush "noise" produced in transducers of the prior art. It produces directly a pulse output which may be transmitted to a remote location over a single channel.

It will be understood that various features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. An analogue to digital transducer including in combination a plurality of pairs of magnetic pickup devices, each of said pickup devices including a winding, means for inducing respective electrical signals in timed sequence in the windings of said pairs of pickup devices, means connecting the windings of each pair of pickup devices in series-opposed relationship whereby each pair of pickup devices produces a pulse output, a support for said pickup devices, a member, means for moving said member relative to said support and magnetic means carried by said member for varying the respective amplitudes of said pulses in accordance with the relative position of said support and said member.

2. An analogue to digital transducer including in combination a support, means carried by said support for producing a group of electrical impulses spaced in time, a member, means mounting said member for movement on said support and means formed of magnetic material carried by said member and independent of said impulse producing means for determining the magnitudes of the respective impulses in accordance with a predetermined pattern to cause said impulses to provide a digital representation of the position of said member on said support.

3. An analogue to digital transducer including in combination a support, a plurality of respective magnetic pickup devices carried by said support, means for inducing respective electrical impulses in said pickup devices in timed sequence to produce a group of impulses spaced in time, a member, means mounting said member for movement on said support and means formed of magnetic material carried by said member and independent of said impulse producing means for determining the magnitudes of said impulses to cause said group of impulses to provide a digital representation of the relative position of said member on said support.

4. An analogue to digital transducer as in claim 3 in which each of said pickup devices has a flux path and in which said magnetic means determine the reluctances of the flux paths to determine said impulse magnitudes.

5. An analogue to digital transducer as in claim 3 in which said impulse inducing means produces fluxes adapted to link said pickup devices and in which said magnetic means shunt certain of said fluxes to determine the magnitudes of said impulses.

6. An analogue to digital transducer as in claim 3 in which each of said pickup devices includes a core formed with an air gap and in which said inducing means include respective magnets, means mounting said magnets in spaced relationship and means for moving said magnet mounting means to move said magnets past said air gaps in timed sequence.

7. An analogue to digital transducer including in combination a support, a plurality of pickup devices carried by said support, each of said pickup devices being formed with an air gap providing a flux path, respective flux producing means, means mounting said flux producing means adjacent said pickup devices at one side thereof for movement past said air gaps to induce respective electrical impulses in said pickups, a plurality of segments of magnetic material, means mounting said segments for movement on said support adjacent said pickup devices on the other side thereof and means for positioning said segments in the area of said air gaps to vary the reluctances of said flux paths, the arrangement of said segments being such that the magnitudes of said impulses are varied to produce a digital representation of the position of said segment mounting means with respect to said support.

8. An analogue to digital transducer including in combination a support, a plurality of pickup devices carried by said support, each of said pickup devices being formed with an air gap providing a flux path, respective flux producing means, means mounting said flux producing means adjacent said pickup devices for movement past said air gaps to induce respective electrical impulses in said pickup devices, a plurality of segments of magnetic material, means mounting said segments for movement on said support between said flux producing means and said pickups to shunt the flux from said flux producing means, the arrangement of said segments being such that said segments shunt the flux from said flux producing means to vary the magnitudes of said impulses to produce a digital representation of the position of said segment mounting means on said support.

References Cited in the file of this patent

UNITED STATES PATENTS

| | | |
|---|---|---|
| 2,765,459 | Winter | Oct. 2, 1956 |
| 2,850,240 | Dickinson | Sept. 2, 1958 |